(12) United States Patent
Sundaresan et al.

(10) Patent No.: US 8,103,737 B2
(45) Date of Patent: Jan. 24, 2012

(54) SYSTEM AND METHOD FOR PREVIEWING HYPERLINKS WITH 'FLASHBACK' IMAGES

(75) Inventors: Neelakantan Sundaresan, San Jose, CA (US); Anita Wai-Ling Huang, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1985 days.

(21) Appl. No.: 09/799,697

(22) Filed: Mar. 7, 2001

(65) Prior Publication Data
US 2002/0129114 A1    Sep. 12, 2002

(51) Int. Cl.
*G06F 15/16* (2006.01)
(52) U.S. Cl. ......................... 709/217; 709/213
(58) Field of Classification Search .......... 709/200–203, 709/213, 217, 219, 223; 715/501.1, 515, 715/526
See application file for complete search history.

(56) References Cited

U.S. PATENT DOCUMENTS

| | | | | |
|---|---|---|---|---|
| 5,963,205 A * | 10/1999 | Sotomayor | ................... | 715/531 |
| 6,058,417 A * | 5/2000 | Hess et al. | ................... | 709/219 |
| 6,119,135 A * | 9/2000 | Helfman | ................... | 715/513 |
| 6,163,778 A * | 12/2000 | Fogg et al. | ................... | 707/10 |
| 6,263,507 B1 * | 7/2001 | Ahmad et al. | ................... | 725/134 |
| 6,271,840 B1 * | 8/2001 | Finseth et al. | ................... | 715/513 |
| 6,356,908 B1 * | 3/2002 | Brown et al. | ................... | 707/10 |
| 6,421,070 B1 * | 7/2002 | Ramos et al. | ................... | 715/763 |
| 6,496,206 B1 * | 12/2002 | Mernyk et al. | ................... | 715/835 |
| 6,496,857 B1 * | 12/2002 | Dustin et al. | ................... | 709/219 |
| 6,584,479 B2 * | 6/2003 | Chang et al. | ................... | 715/512 |
| 6,606,654 B1 * | 8/2003 | Borman et al. | ................... | 709/219 |
| 6,665,838 B1 * | 12/2003 | Brown et al. | ................... | 715/501.1 |
| 6,678,673 B1 * | 1/2004 | Eves et al. | ................... | 707/3 |
| 6,693,652 B1 * | 2/2004 | Barrus et al. | ................... | 715/838 |
| 6,732,161 B1 * | 5/2004 | Hess et al. | ................... | 709/219 |
| 6,772,139 B1 * | 8/2004 | Smith, III | ................... | 707/748 |
| 7,089,563 B2 * | 8/2006 | Nagel et al. | ................... | 719/313 |
| 7,877,407 B2 * | 1/2011 | Smith, III | ................... | 707/774 |

* cited by examiner

*Primary Examiner* — Moustafa M Meky
(74) *Attorney, Agent, or Firm* — IP Authority, LLC; Ramraj Soundararajan

(57) ABSTRACT

A system and method for previewing hyperlinks with textual abstracts. The system provides users with previews of previously visited hyperlinks through textual abstracts of the web destination pages. The textual abstracts provide visual cues to remind the user of a page's content. Further, the system presents previews of the destination of the hyperlinks to the user in a dynamic browsing environment which is independent of any WWW browser and operating system. Such a system is implemented through a proxy-server or client-side program. Finally, the system is configurable to allow for the customization of how and which textual abstract to display.

20 Claims, 5 Drawing Sheets

```
<a   href="http://w3.almaden.ibm.com/almorg.html">
     Plane reference
     </a>
```

```
<a   href="http://w3.almaden.ibm.com/almorg.html"
     onFocus="document.preview_img.src='almorg.bmp' "/>
     Plane reference
     <a/>
     <img name = "preview_img" src="preview_foo.bmp"/>
```

FIG. 4

SYSTEM AND METHOD FOR PREVIEWING HYPERLINKS WITH 'FLASHBACK' IMAGES

BACKGROUND OF THE INVENTION

1. Field of Invention

This invention relates to the world wide web, and more particularly, to a system and method for previewing hyperlinks with textual abstracts.

2. Discussion of Prior Art

With the world wide web steadily becoming a major communication and research medium, advertisers and others have searched for effective means for conveying information, including advertisements, to web users. Users may request and receive web pages/documents through their web browsers at their respective remote terminals. Web browsers have become fundamental to everyday computer usage. Navigating web documents over hyperlinks (which may contain textual addresses of a web page's location, access protocol, data type and name of the web documents) has become a routine part of web browsing. Users of web browsers often encounter hyperlinks with identical destinations while browsing clusters of web documents. Further, in the browsing process, users often backtrack to revisit previously viewed documents. Visiting a huge array of web documents through hyperlinks, users often do not remember which hyperlink lead to a particular web document that may have been of interest. Hence, users repeatedly traverse previously visited hyperlinks to remind themselves of the content of their destinations. This browsing strategy forces the user to plough through a multitude of irrelevant web pages to rediscover the ones that are of interest. This therefore, results in an ineffective way of browsing and may ultimately cause users to get lost in cyberspace. What is needed is a method to assist in the reviewing of hyperlinks during the browsing process.

The prior art in this area is characterized by a conventional browser such as Microsoft Windows Explorer® which provides for a view called "Thumbnail View" that shows a miniature representation of graphic files such as GIFs (Graphic Interchange Format), JPEGs (Joint Photographic Experts Group), and HTML (Hypertext Markup Language) pages that reside on a local system in an Explorer Window. This view allows users to preview multiple web sites and multiple graphic formats, simultaneously without visiting the sites, or opening the files. However, the Microsoft® system fails to provide on-line previewing of the hyperlinks in the WWW pages, but rather only of web documents on the file system. Further the Microsoft® system is embedded into Windows Explorer® as compared to the present invention that is independent of any particular web browser and operating system.

The present invention overcomes the drawbacks of the prior art by providing a system and method which presents to the user, previews of previously visited hyperlinks through miniature graphical representations, thumbnail views of the destination pages or thumbnail views of all hyperlinks within a web page. The previews of the destinations of hyperlinks are given in a dynamic browsing environment. The layout, colors, and images of these previews provide visual cues to remind the user of the page's content. Hence, the system enables the user to view the contents of the page without actually having to visit the page. This system is independent of any web browser and operating system and is implemented through a proxy-server or client-side program. Finally, the system is configured to allow for the customization of content and selection of thumbnail views to display. These and other improvements are achieved by the detailed description that follows.

SUMMARY OF THE INVENTION

A system and method is described for previewing hyperlinks via textual abstracts. Generally, the system provides users with previews of previously visited hyperlinks through textual abstracts of the destination web pages. The abstracts provide visual cues to remind the user of a web page's content. Further, the system presents the abstracts of the destinations of the hyperlinks to the user in a dynamic browsing environment which is independent of any WWW browser or operating system. Such a system is implemented through a proxy-server or client-side program. Finally, the system is configured to allow for the customization of content and selection of textual abstracts to display.

The present invention's method for previewing and storing textual abstracts of requested web pages and their associated out-links comprises the following steps: (a) receiving a request for a web page from a web site; (b) downloading the web page from said web site via a browser; (c) determining if the web page has been previously visited, and if so, determining if one or more hyperlinks are present in the downloaded web page;

determining for each hyperlink whether a textual abstract is stored within the database;

for each hyperlink having a stored textual abstract, modifying said downloaded web page to include a reference to said stored textual abstract, and displaying said modified downloaded web page wherein said stored textual abstracts are rendered upon selecting associated hyperlinks in said downloaded web page at said remote terminal, else capturing a textual abstract of said downloaded page; and storing said captured textual abstract and associated hyperlink, wherein said stored textual abstracts are rendered upon selecting such associated hyperlinks in requested web pages.

These and other improvements are achieved by the detailed description that follows.

BRIEF DESCRIPTION OF THE DRAWINGS

FIG. 4 illustrates a java script for transformation of an anchor element to include a thumbnail image file attachment.

DESCRIPTION OF THE PREFERRED EMBODIMENTS

Figure 1A:
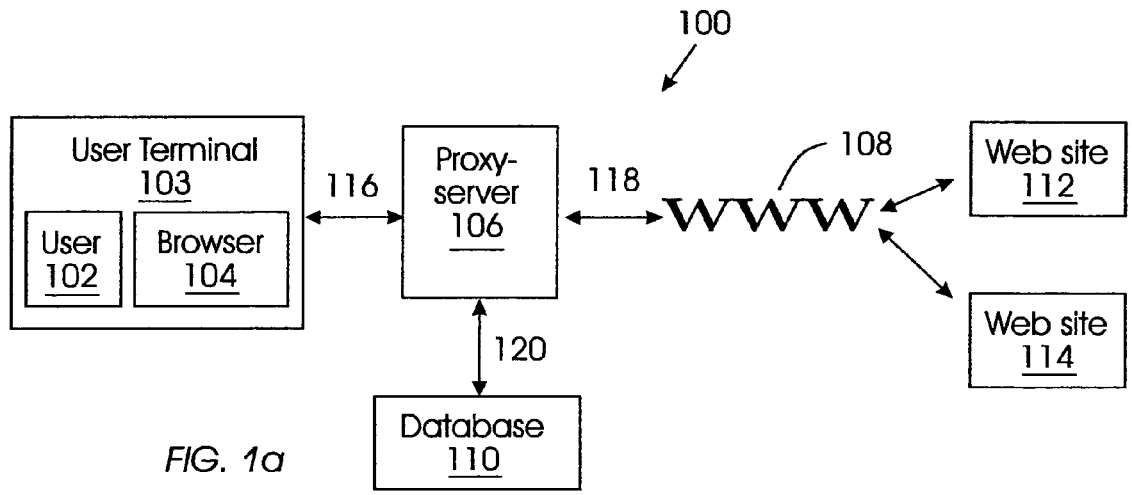
FIG. 1a illustrates the architecture of a preferred embodiment of the present invention hyperlink preview system.

While this invention is illustrated and described in a preferred embodiment, the system may be implemented in many different configurations, forms and materials. There is depicted in the drawings, and will herein be described in detail, a preferred embodiment of the invention, with the understanding that the present disclosure is to be considered as a exemplification of the principles of the invention and the associated functional specifications of the materials for its construction and is not intended to limit the invention to the embodiment illustrated. Those skilled in the art will envision many other possible variations within the scope of the present invention.

FIG. 1a illustrates the architecture of the present invention hyperlink preview system 100. The system is connected to the World Wide Web (WWW) 108 which comprises a group of networks that are interconnected so that they appear to be one continuous large network. User 102, on user terminal 103, requests a web page from any one of a plurality of web sites 112-114 through browser 104. Proxy-server 106 interconnects browser 104, WWW 108, and database 110 via communication lines 116, 118 & 120, respectively. The functions of proxy server 106 may include for example, but are not limited to, providing an effective and secure barrier between a local/internal network (not shown) and WWW 108. The proxy server blocks various protocols and IP addresses from entering the internal network and at the same time controls the protocols the used to access WWW 108. Finally, in the present invention, proxy server 106 offers web caching capabilities for storing miniature images of previously visited web sites and their associated out-links and providing local access to users who re-visit the sites or associated out-links. Continuing in FIG. 1a, if the requested web page is not in database 110 (i.e., the requested page has never been visited), software residing within proxy server 106 creates a miniature image of the page and enters the image into database 110. Software to create the miniature images is known in the art and can be located remotely from the proxy server without departing from the scope of the present invention. Furthermore, the system enhances the visited out-links (described below) of the web page with corresponding miniature images in database 110. The browser displays retrieved web pages and corresponding miniature images to selected displayed hyperlinks as overlays to enhance browsing.

Figure 1B:
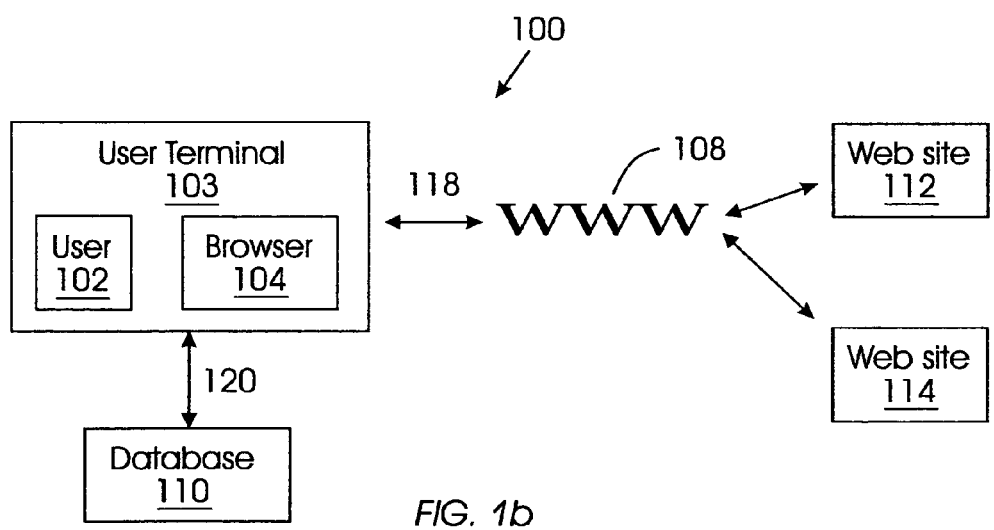
FIG. 1b illustrates the architecture of a secondary embodiment of the present invention hyperlink preview system.

FIG. 1b illustrates a secondary embodiment system architecture. The invention is either performed through a proxy server 106, as described above and shown in FIG. 1a, or directly through a user terminal (client/browser-side) 103 as shown in FIG. 1b. In both cases, the present invention parses the document and its links, accesses database 110, and returns to browser 104 an edited document. The proxy server implementation relieves the user of storing large amounts of data associated with each of the previously traversed hyperlinks. The client-side (FIG. 1b), however, relieves user 102 of relying on the existence of the proxy server 106 and from the performance bottle neck of the proxy server serving other users.

Figure 2:
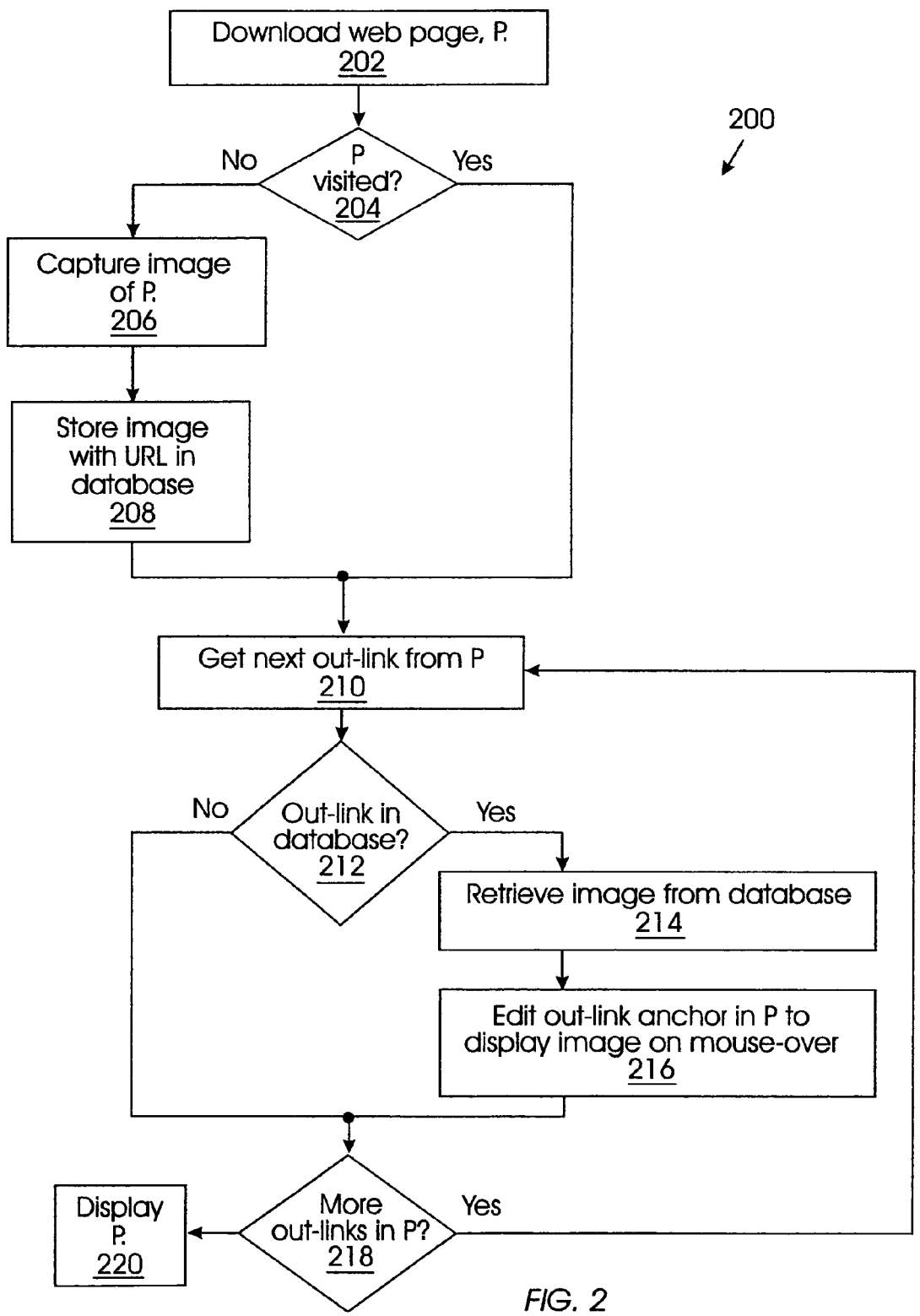
FIG. 2 illustrates a flow diagram depicting the steps for storing and previewing visited hyperlinks.

FIG. 2 illustrates a flow diagram 200 depicting the steps for storing and previewing visited web pages and associated hyperlinks. In step 202, a user requests a web page P which is then downloaded to the proxy server 106. The system in step 204 determines if downloaded web page P has been previously visited. If downloaded web page P has never being visited, then the system produces an miniature image-capture 206 of the web page P and proceeds to store the miniature image-captured with its respective URL (Uniform Resource Locator) in database 110 as illustrated in step 208. One way that the system can produce an image capture of a web page is by opening it with a browser and using one of any of the commercially available capture programs (e.g., Paint Shop Pro®, Capture®, etc.) to produce an image of the displayed page. The database contains tables of previously visited URLs with their corresponding image-captures. The downloaded web pages may contain HTML anchor elements also referred to as hyperlinks/out-links.

Once the page is stored, or if it was determined in step 204 that the page was already visited 207, the system proceeds to evaluate all out-links 210 contained within downloaded web page P by performing the steps 212-218 for each out-link discovered in step 210. In step 212, the system determines if the retrieved out-link appears in the database (i.e., has been previously visited). If the out-link is present within the database, then the system retrieves the image-capture from the database 214 and annotates the line reference (eg. HTML anchor element) with an event object 216, such as an "On-Mouse-Over". Further, in step 218 the system determines if more out-links are contained within web page P. If there are no more out-link(s) contained within web page P, the system invokes a script to display the image as a pop-up thumbnail view in step 220. Referring back to step 212, if out-link(s) are not present within the database the system proceeds to step 218. In step 218, if more out-links are present within the web page P, the system returns to step 210 and proceeds as discussed above. In a second embodiment, if an out-link does not have an associated image stored (i.e., the link has not been previously visited), then the link reference is maintained. In a third embodiment, if an out-link does not have an associated image stored, the system visits the web page, generates an image for it and stores such image in the database.

Figure 3:
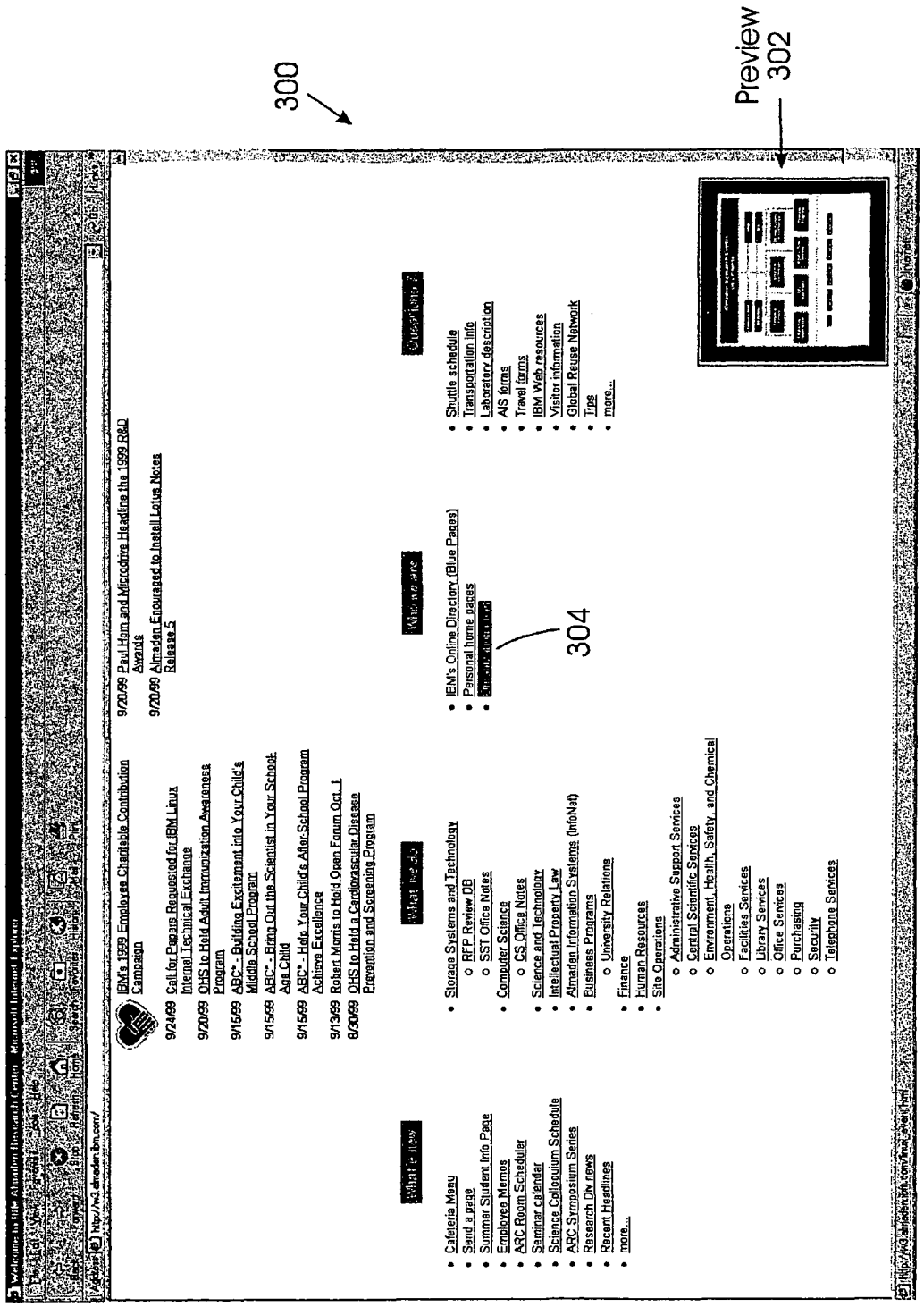
FIG. 3 illustrates a web page with thumbnail preview.

FIG. 3 illustrates web page 300 with thumbnail preview 302. As a specific example, a hyperlink to URL http://w3.almaden.ibm.com/almorg.html found in a downloaded page is considered. If the user traverses this hyperlink, thereby downloading the page, the system captures a thumbnail view of the document as an image file ("almorg.bmp") and stores it in database 110. The system uses this image-file to provide an event-driven "flashback image" to the user each time the user encounters the same URL on subsequent pages. For example, when the user highlights the hyperlink with anchor-text "organization chart" 304, the system presents thumbnail preview 302 of the destination in the bottom-right corner of the web page. This view provides the user with a visual summary of the web page associated with the highlighted hyperlink.

FIG. 4 illustrates a java script for transformation of the above anchor element to include a thumbnail image file attachment. The system transforms the anchor elements found in a future page which contains the almorg-URL as follows:

<a href="http://w3.almaden.ibm.com/almorg.html">
      Plane reference
    </a>

This Javascript describes a plain reference linking to the organization charts page.

<a href="http://w3.almaden.ibm.com/almorg.html"
      onfocus="document.preview_img.src='almorg.bmp'"/>
      Plane reference
    <a/>
    <img name="preview_img" src="preveiw_foo.bmp"/>

After the transformation, the annotated reference links to the previously visited "organization chart" page. A JavaScript in this new reference performs the following actions. When the user selects the element as the page focus, a pop-up image of the organization charts page (in almorg.bmp) appears on the designated part of the page (for example the bottom-right corner in FIG. 3). In this example, the designated part contains an image element named "preview-img." on focus, the script sets the source of this image element to the thumbnail image.

The system edits all web documents in a similar manner before it allows browser 104 to display them. The system therefore presents to the user a thumbnail view of all previously visited hyperlink(s) destinations in one embodiment and all hyperlink destinations in another embodiment. In a third embodiment, thumbnail images for every out-link are generated on-the-fly each time a web page is downloaded. The implementation of the present invention requires the system to crawl each downloaded web page one level deep to generate an image for each URL without requiring the use of a database. In all embodiments, the system inevitably facilitates web navigation thereby increasing the efficiency of browsing.

This system allows a user to configure the appearance of the visual cues and the engagement and disengagement of the system. For instance, the system permits the user to choose whether to make a pop-up icon(s) appear beside each hyperlink on a mouse-over, to appear in a designated area of the page on focus or appear in an entirely separate window. These variations only require changes in parameters in the component that edits the hypertext references. Finally, the system filters and displays particular URLs based on the users pre-defined configuration. For example, the system allows the user to specify not to preview URLs that have host-name "w3.almaden.ibm.com" or to only preview URLs with extension "html".

Figure 5:
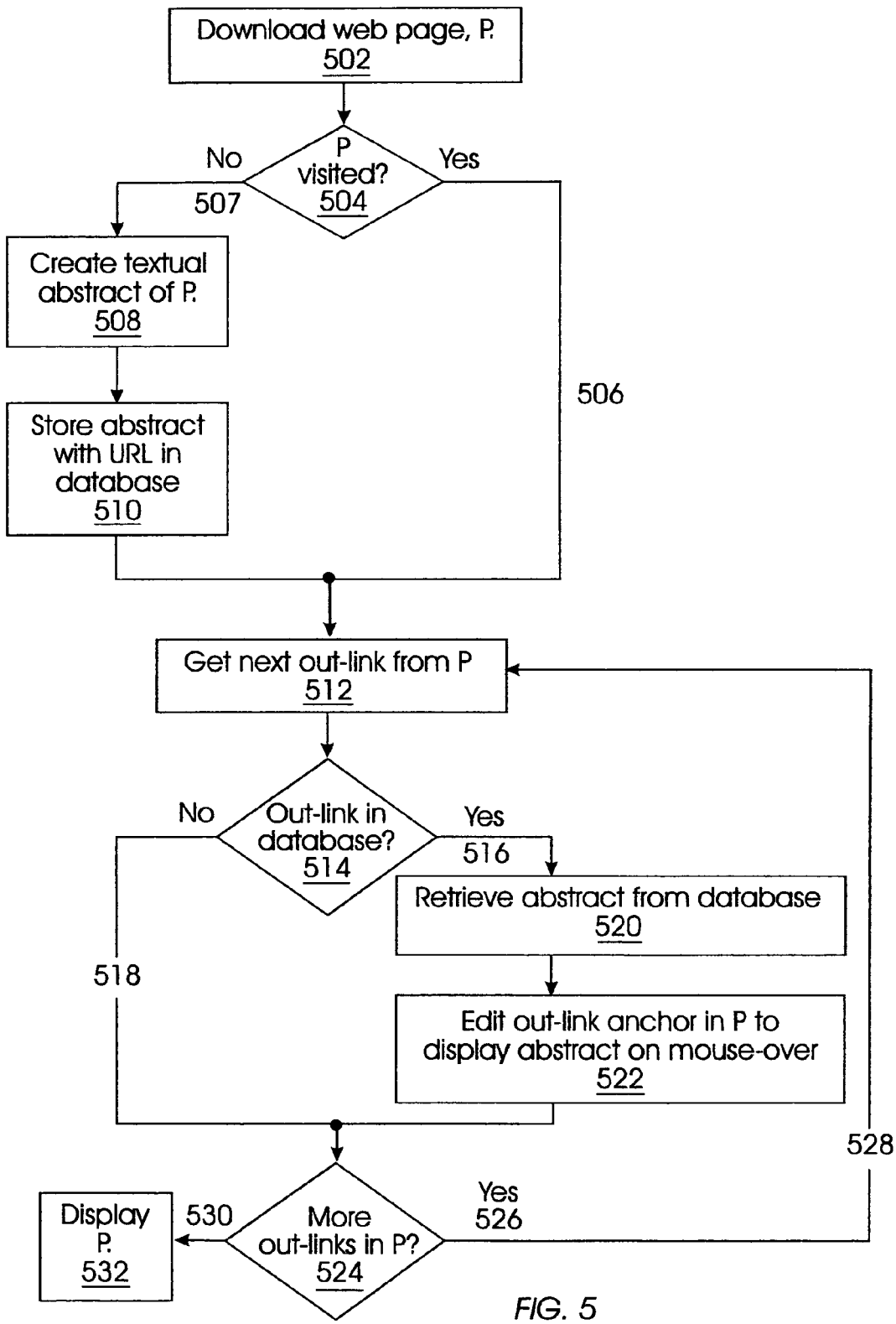
FIG. 5 illustrates a flowchart for a textual embodiment of the present invention.

Referring to FIG. 5, the system is extensible to text based previews as shown in flowchart 500. Web page "P" is downloaded 502 and it is determined if the page has been previously visited 504. If the page is new 507, the system produces a text-based abstract 508 from the downloaded document instead of an image-based abstract. The abstract consists of different elements of the downloaded page such as the title, keyword, and size of the downloaded page file. Moreover, the system allows the user to choose the content of the automatically generated abstract (e.g., "include title only" or "include both title and keywords", etc.). The abstract is stored with URL in the database 510, much the same as the images. Once this is completed, or if a page was previously visited, the system proceeds to get out-links from P 512. If the out-link is in the database 514/516, then its abstract is retrieved 520 with the user to able to edit the abstract 522 when it is generated. For example, after downloading a web page, the user views and edits the abstract or manually appends to the page pre-defined users configuration/parameters. For example, the abstract is played as an audio clip in the background or viewed as a pop-up text in a designated part of the web page.

If no out-links are in the database 518 or if more out-links exist for P 524/526, the steps for getting an out-link are repeated 528. When all out-links are processed 530, the abstracts are displayed 532, or in the alternative played as an audio clip as described above.

The above enhancements for previewing hyperlinks with flashback images and its described functional elements are implemented in any conventional Internet communication browser, software or operating systems. For example, the present invention may be implemented through a proxy server or client-side program that returns to the browser an edited document.

CONCLUSION

A system and method has been shown in the above embodiments for the effective implementation of previewing hyperlinks with flashback images for web navigating. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by browser, software/program, computing environment, or specific computing hardware.

The invention claimed is:

1. A method for assisting a user during web navigation, said web navigating performed over a communication network including one or more proxy servers, one or more web sites and at least one remote terminal, said communication network interconnecting said web site, said server, and said remote terminal, said method comprising the following steps:
    processing a request from said at least one remote terminal of one or more web pages from said one or more web sites;
    downloading said requested one or more web pages;
    automatically capturing a abstract containing only text from each of said one or more downloaded web pages and storing each textual abstract with their associated hyperlink in a database, wherein an abstract of a given downloaded web page comprises elements of said given downloaded web page including at least the following: title and one or more keywords, said elements previously identified based on received inputs; and
    transforming at least one HTML anchor element in each of said one or more downloaded web pages to render abstracts containing only text upon selecting such associated hyperlinks in a web page requested by said at least one remote terminal.

2. A method for assisting a user during web navigation, as per claim 1, wherein said processing, downloading, capturing and storing steps are performed by said proxy server.

3. A method for assisting a user during web navigation, as per claim 1, wherein said at least one remote terminal is operatively connected to a browser.

4. A method for assisting a user during web navigation, as per claim 3, wherein said browser provides for visually previewing said associated hyperlink in a web page by rendering said textual abstract.

5. A method for assisting a user during web navigation, as per claim 1, wherein said method allows for previewing the contents of said downloaded one or more web pages without having to visit said downloaded one or more web pages.

6. A method for assisting a user during web navigation, as per claim 1, wherein said database contains one or more tables of previously visited hyperlinks with their corresponding captured textual abstracts.

7. A method for assisting a user during web navigation, as per claim 1, wherein said textual abstracts are automatically captured each time said one or more web pages are downloaded.

8. A method for assisting a user during web navigation, as per claim 1, wherein said textual abstracts are rendered as an audio clip upon selecting said associated hyperlinks.

9. A method of assisting a user during web navigation, as per claim 1, wherein said textual abstracts are rendered via a pop-up window upon selecting said associated hyperlinks.

10. A method for previewing and storing textual abstracts of requested web pages and their associated out-links, said method comprising the following steps:
    (a) receiving a request for a web page from a web site;
    (b) downloading said web page from said web site via a browser;
    (c) determining if said web page has been previously visited,
        if so:
            determining if one or more hyperlinks are present in said downloaded web page;
            determining for each hyperlink whether a textual abstract is stored within said database;

for each hyperlink having a stored textual abstract, automatically modifying said downloaded web page to include a reference to said stored textual abstract, and displaying said modified downloaded web page wherein said stored textual abstracts are rendered upon selecting associated hyperlinks in said downloaded web page at said remote terminal, else, automatically capturing a textual abstract of said downloaded page, wherein abstract of a given downloaded web page comprises elements of said given downloaded web page including at least the following: title and one or more keywords, said elements previously identified based on received inputs; and storing said captured textual abstract and associated hyperlink, wherein said stored textual abstracts are rendered upon selecting such associated hyperlinks in requested web pages.

11. A method for previewing and storing textual abstracts of requested web pages and their associated out-links, as per claim 10, wherein said selecting of hyperlinks with stored textual abstracts invokes a script to display said textual abstract as a pop-up view.

12. A method for previewing and storing textual abstracts of requested web pages and their associated out-links, as per claim 10, wherein said selecting of hyperlinks includes a mouse-over operation.

13. A method for previewing and storing textual abstracts of requested web pages and their associated out-links, as per claim 10, wherein said hyperlinks maintained on said browser, are selectively highlighted and a corresponding thumbnail view of said web page is displayed at said remote terminal.

14. A method for previewing and storing textual abstracts of requested web pages and their associated out-links, as per claim 10, wherein said textual abstracts are rendered as an audio clip upon selecting said associated hyperlinks.

15. A system for previewing hyperlinks while browsing the world wide web, said system connected to a user terminal which requests one or more web pages from the world wide web, said terminal including a browser, said browser functionally connecting said user terminal to the world wide web and displaying one or more hyperlinks, said system comprising:

a proxy server, operatively connected to said user terminal, downloading said requested one or more web pages from said world wide web;

a database operatively connected to said proxy server for storing said textual abstracts and associated hyperlinks, wherein proxy server determines whether said requested one or more web pages have been downloaded before, if so:

determining if one or more hyperlinks are present in a downloaded web page;

determining for each hyperlink whether a textual abstract is stored within said database;

for each hyperlink having a stored textual abstract, automatically modifying said downloaded web page to include a reference to said stored textual abstract, and displaying said modified downloaded web page wherein said stored textual abstracts are rendered upon selecting associated hyperlinks in said downloaded web page at said remote terminal, else, creating a textual abstract of a specified requested web page and associated hyperlink, wherein said stored textual abstracts are rendered upon selecting such associated hyperlinks in requested web pages, wherein textual abstract of a given specified requested web page comprises elements of said given specified requested web page including at least the following: title and one or more keywords, said elements previously identified based on received inputs.

16. A system for previewing hyperlinks while browsing the world wide web, as per claim 15, wherein said proxy server produces an event-driven textual abstract at said user terminal each time a specific hyperlink is encountered on a subsequent reviewed web page.

17. A system for previewing hyperlinks while browsing the world wide web, as per claim 15, wherein said proxy server automatically generates said textual abstracts corresponding to said downloaded one or more web pages.

18. A system for previewing hyperlinks while browsing the world wide web, as per claim 15, wherein said textual abstracts are rendered as an audio clip upon selecting said associated hyperlinks.

19. A system for previewing hyperlinks while browsing the world wide web, as per claim 15, wherein said textual abstracts are rendered via a pop-up window upon selecting said associated hyperlinks.

20. An article of manufacture comprising a computer usable medium having computer readable program code embodied therein for previewing textual abstracts of hyperlink destinations for browsing a communication network, said article comprising:

programmable code, operative with a web browser, retrieving one or more requested web pages from said communication network;

said programmable code capturing, and storing in computer storage, textual abstracts of said requested one or more web pages and their associated out-links, wherein textual abstract of a given requested web page comprises elements of said given requested web page including at least the following: title and one or more keywords, said elements previously identified based on received inputs;

said programmable code automatically modifying said one or more requested web pages to include a reference to said textual abstract of requested one or more web pages and their associated out-links; and wherein said programmable code effects display of textual abstracts as overlayed pop-ups on a presently displayed web page when associated hyperlinks are highlighted in requested web pages.

* * * * *